June 3, 1958 — J. G. FORÉ — 2,837,699
PANELBOARD CONSTRUCTION
Filed Sept. 8, 1953

Inventor
James G. Foré
By W. C. Lyon
Attorney ered that various changes may be made without departing from the scope of my invention as set forth in the appended claims.

United States Patent Office
2,837,699
Patented June 3, 1958

2,837,699

PANELBOARD CONSTRUCTION

James G. Foré, Fresno, Calif., assignor to Cutler-Hammer, Inc., Milwaukee, Wis., a corporation of Delaware Application September 8, 1953, Serial No. 378,857

3 Claims. (Cl. 317—119)

This invention relates to electrical panelboards and more particularly to a novel bus and terminal arrangement for such panelboards.

Because panelboards are used for a wide variety of applications it is necessary for a panelboard supplier to stock them in a corresponding variety of types and sizes. A rather large inventory has thus been required where for merchandising reasons a minimum inventory is most desirable.

Accordingly, it is an object of my invention to provide an electrical panelboard assembly which by virtue of its construction provides for maximum flexibility of circuit arrangements.

Another object of my invention is to provide for the use of plug-in circuit-breaker units for either single-phase or three-phase application with a minimum of difficulty and without necessity of costly modifications in the panel bus structure.

It is another object of my invention to provide a panelboard construction having improved means for feeding a compact grouping of circuit breaker type switch units.

Another object of my invention is to provide in an electrical panelboard a bus structure and terminal arrangement which is fully accessible for inspection with the switch units in place.

It is another object of my invention to provide a panelboard assembly which is readily adaptable to all panelboard modifications such as the use of split bus, increased capacity mains, and the use of lugs or clips for the sub-feed.

The above and other objects and advantages of my invention will appear from the following detailed description when read in connection with the accompanying drawings.

Although the invention has been shown applied to a panelboard having a single bus structure and using only single-pole circuit-breaker units, it will be obvious to those skilled in the art that it will apply equally well to other panelboard and switch structures.

Referring now to the drawings.

Figure 1:
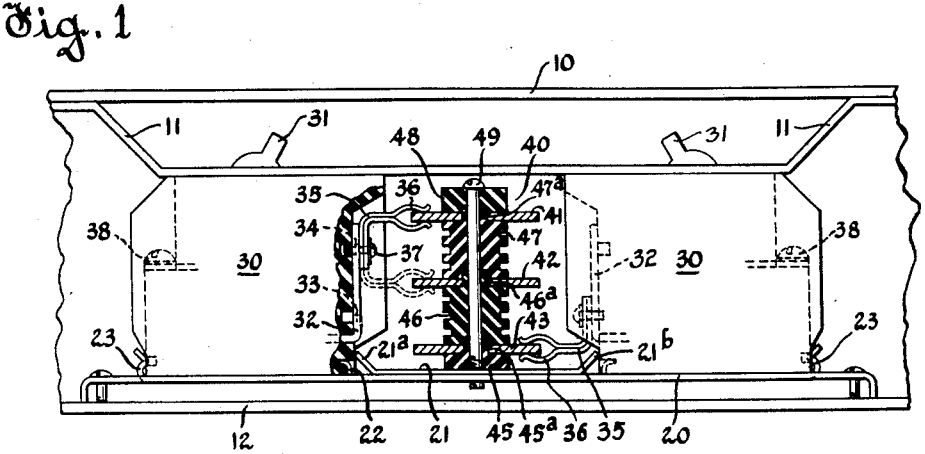
Figure 1 is a fragmentary partly sectioned view of a panelboard embodying the invention.

Referring specifically to Fig. 1, it will be seen that the panelboard there shown comprises an enclosure 10, a bus bar and switch mounting plate 20, switch units 30 and a bus bar assembly 40.

The enclosure trim 10 includes a rabbet plate 11 at the front which is suitably apertured to permit projection therethrough of switch operating handles 31, and also includes at the back a member 12 to which is secured as by screws or other suitable fastening means the bus bar and switch mounting plate 20.

To provide for the attachment of switch units 30 to the mounting plate 20, portions of the plate are turned up as at 22 and 23 for engagement with indentations formed in the switch housings. Thus the switch units may readily be attached to and removed from the assembly. The mounting plate 20 also has secured thereto an electrical insulator 21 having upwardly bent end portions 21$^a$, 21$^b$ for engagement with the ends of the several switches 30 to insure proper electrical insulation between mounting plate 20 and the adjacent current carrying parts, bus bar assembly 40 and bus clamps 36.

Figure 3:
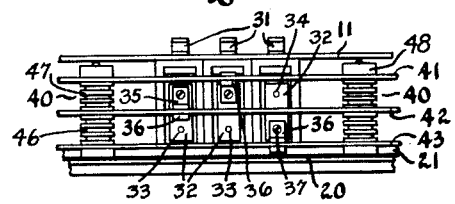
Fig. 3 is a fragmentary elevational view of the bus structure and one row of the switch units connected thereto.

The operating mechanism of the switch units 30 is not shown because it forms no part of the present invention. It may be a conventional snap-acting switch mechanism or it may include a circuit-breaker construction. However, the line terminal construction for the switch units should have provision for placing the bus engaging portions in any one of a plurality of positions. A preferred form of such line terminal construction is best illustrated in Figs. 1 and 3. It includes an upstanding terminal strip 32 having tapped openings 33, 34 which are positioned apart from each other a distance equal to that between the center-lines of two adjacent bus bars. An L-shaped line terminal member 35 having a bus bar clamp 36 is attached to said terminal strip by means of a threaded bolt 37 inserted into the opening 34. As shown in the drawing, the bus clamp 36 is in position to engage the top bus bar 41. However, by loosening the bolt 37 it may readily be shifted to the position shown in dotted lines (Fig. 1) to engage the intermediate bus bar 42. The terminal member 35 may just as readily be positioned for engagement with either the lower or intermediate bus bars, 43 or 42, respectively, by removing the bolt 37 from the opening 34 and reinserting it in the tapped opening 33 (Fig. 1) to position the bus clamp at the lower end of the terminal strip 32. (In Fig. 1, the switch to the right is shown with its bus clamp in said latter position. In Fig. 3 the bus clamps are shown in three of the four possible positions.) The load terminals 38 are positioned at the outer ends of the respective switch units to facilitate wiring thereof.

Figure 2:
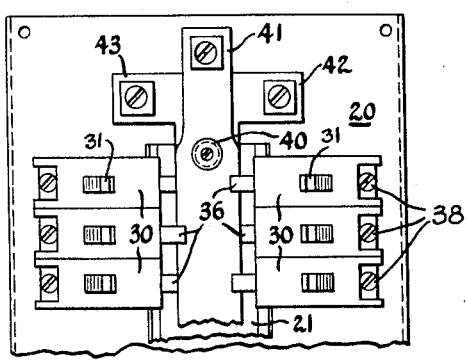
Fig. 2 is a fragmentary plan view, on a reduced scale, of the panelboard assembly shown in Fig. 1, the enclosure and rabbet plate being removed.

As shown in Figs. 1, 2 and 3 the bus bars 41, 42, 43 are positioned in parallel relation between the two rows of switch units. For mounting said bus bars on the mounting plate 20 I have provided a plurality of groups of nested insulating members 45, 46, 47 and 48 which, when properly assembled, will readily and securely retain the bus bars in place. Members 45, 46 and 47 are respectively provided with upstanding reduced neck portions 45$^a$, 46$^a$ and 47$^a$, and members 46, 47 and 48 are each provided with corresponding recesses for receiving said reduced portions. All of said members are centrally apertured to receive a fastening bolt 49. Thus by inserting the reduced portions 45$^a$, 46$^a$, 47$^a$ of the insulators through suitably positioned openings in the bus bars, placing the capping insulator 48 on the topmost bus bar and then tying the entire assembly together by means of bolt 49, an exceptionally simple and flexible bus bar mounting arrangement is provided.

Figure 4:
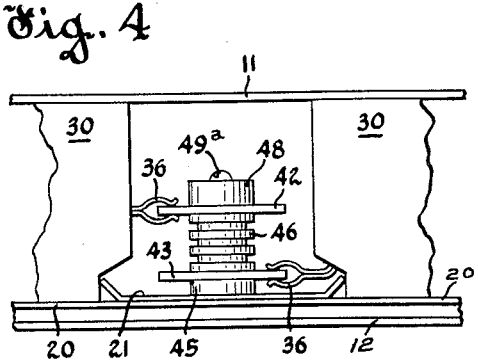
Fig. 4 is a fragmentary end elevational view showing the bus structure arranged for single phase application.

The unusual versatility of my novel and improved bus bar structure for panelboards will be further observed by reference to Fig. 4. I have there shown how a polyphase panelboard such as that shown in Fig. 1 may readily be converted to a single-phase panelboard requiring only two bus bars by removing the bus bar 41 and insulating members 47 from the assembly and reattaching the remaining parts to the mounting plate by bolts 49$^a$ of shorter length.

Although I have shown and described only one basic embodiment of my invention, it is to be understood that various changes may be made in the structural details thereof without departing from the spirit of my invention or the scope of the appended claims.

I claim:

1. An electrical panelboard assembly comprising, in combination, a sheet metal mounting member; a plurality of individual enclosed switch units each including an adjustably positionable spring-clip type terminal, said switch units being attached to said mounting member in two parallel spaced apart rows with the spring-clip type terminals of each of said rows extending toward the other of said rows; and a plurality of flat bus bars for effecting supply of current to said switch units, said bus bars being positioned at different levels, one above the other, on said mounting member between said rows of switch units with their opposite edges extending in the direction of said switch units, and each of said bus bars being engageable by those of said spring-clip type terminals positioned at a corresponding level.

2. An electrical panelboard assembly comprising, in combination, an enclosure formed of sheet metal, a flat sheet metal mounting member attached to said enclosure in spaced relationship to the inner wall thereof, a bus structure centrally attached to said mounting member and including a plurality of flat bus bars stacked outwardly from said mounting member in parallel relationship thereto and in parallel relationship to each other, means for insulating said bus bars from said mounting member and from each other, a plurality of switching units each having a spring-clip type of bus engaging terminal member attached to the end thereof adjacent said bus members, each switching unit having indentations formed in the respective outer end walls thereof, said mounting member having integral lugs formed thereon and bent upwardly therefrom for interlocking engagement with the walls of said indentations, whereby each switch is retained in assembled relation to its associated bus member and to said mounting member, and means providing for mounting of each spring-clip type of bus engaging terminal whereby the same may engage any one of said bus members.

3. An electrical panelboard assembly comprising, in combination, an enclosure formed of sheet metal, a flat sheet metal mounting member attached to said enclosure in spaced relationship to the inner wall thereof, a bus structure centrally attached to said mounting member and including a plurality of flat bus bars stacked outwardly from said mounting member in parallel relationship thereto and in parallel relationship to each other, means for insulating said bus bars from said mounting member and from each other, a plurality of switching units each having a spring-clip type of bus engaging terminal member attached to the end thereof adjacent said bus members, each switching unit having indentations formed in the respective outer end walls thereof, said mounting member having integral lugs formed thereon and bent upwardly therefrom for interlocking engagement with the walls of said indentations, whereby each switch is retained in assembled relation to its associated bus member and to said mounting member, and means providing for mounting of each spring-clip type of bus engaging terminal whereby the same may engage any one of said bus members, said last mentioned means providing for mounting of its associated bus engaging terminal in any one of four different positions.

References Cited in the file of this patent

UNITED STATES PATENTS

| | | |
|---|---|---|
| 1,047,085 | Krantz | Dec. 10, 1912 |
| 1,321,486 | Starrett | Nov. 11, 1919 |
| 2,103,325 | Frank | Dec. 28, 1937 |
| 2,147,023 | Frank | Feb. 14, 1939 |
| 2,165,203 | Albers | July 11, 1939 |
| 2,351,942 | Dyer | June 20, 1944 |
| 2,530,548 | Stanley | Nov. 21, 1950 |
| 2,632,039 | Hammerly | Mar. 17, 1953 |